(12) United States Patent
Inoue et al.

(10) Patent No.: US 6,435,721 B1
(45) Date of Patent: Aug. 20, 2002

(54) SPINDLE MOTOR UNIT HAVING HYDRODYNAMIC BEARING

(75) Inventors: Hiroshi Inoue, Osaka; Masashi Omura, Hyogo; Hiromichi Inomata, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 75 days.

(21) Appl. No.: 09/696,914

(22) Filed: Oct. 27, 2000

(30) Foreign Application Priority Data

Oct. 29, 1999 (JP) .......................... 11-309299
Nov. 5, 1999 (JP) .......................... 11-315177

(51) Int. Cl.[7] ............................................. F16C 17/04
(52) U.S. Cl. ...................................... 384/123; 384/112
(58) Field of Search ................................ 384/123, 112, 384/107, 121, 124

(56) References Cited

U.S. PATENT DOCUMENTS 5,770,906 A * 6/1998 Hazelton et al. ............ 384/123
6,126,320 A * 10/2000 Ichiyama .................... 384/107
6,176,618 B1 * 1/2001 Kawawada et al. ......... 384/107

* cited by examiner

*Primary Examiner*—Lenard A. Footland
(74) *Attorney, Agent, or Firm*—Wenderoth, Lind & Ponack, L.L.P.

(57) ABSTRACT

In order to allow lubricant to move from the outside into the inside of a thrust bearing easily, an escape is provided in a base and a circumferential recess in a plate. As a result, a hub with magnetic disks mounted thereon can rapidly float up in a correct position at start-up of rotation thereby to perform correct recording and reproduction of information.

1 Claim, 12 Drawing Sheets

SPINDLE MOTOR UNIT HAVING HYDRODYNAMIC BEARING

FIELD OF THE INVENTION

The present invention relates to a spindle motor unit having a hydrodynamic bearing that can be used for a hard disk, and the like.

BACKGROUND OF THE INVENTION

A conventional spindle motor unit having a hydrodynamic bearing is described below. FIG. 9 is a cross sectional view of a conventional spindle motor unit having a hydrodynamic bearing used for a hard disk, at rotation. FIG. 10 is an enlarged partial view of FIG. 9 illustrating a thrust bearing of the spindle motor unit at rest and placed in a normal position. FIG. 11 illustrates the thrust bearing shown in FIG. 10 at rest and placed in a vertically inverted position. FIG. 12 is a top view of flange 3 used in the spindle motor unit, and cross sectional views of flange 3 shown in FIGS. 10 and 11 are taken on lines 10(11)—10(11) of FIG. 12.

Referring to FIGS. 9 through 12, base 1 has radial bearing 1a and thrust support 1b. Rotating shaft 2 that co-axially rotates with respect to base 1 is supported by the radial bearing 1a. Flange 3 is secured to the lower end of rotating shaft 2 by a machine screw.

Flange 3 has grooves 3a and 3b formed of projections and depressions on its top and bottom faces, respectively. Plate 4 has thrust support 4a in a position opposed to grooves 3b on flange 3, and is secured to a bottom face of base 1 by a machine screw. Lubricant 5 exists between radial bearing 1a and rotating shaft 2, between thrust support 1b on base 1 and grooves 3a on flange 3, and between grooves 3b on flange 3 and thrust support 4a on plate 4. Hub 6 with magnetic disks 7 mounted thereon is co-axially fixed to rotating shaft 2.

In a spindle motor unit having a hydrodynamic bearing structured as above, a rotating body including magnetic disks 7 and rotating shaft 2 floats up in a predetermined position during its rotation; thereby such information as picture, audio, and text, is recorded into magnetic disks 7 or recorded information is reproduced from magnetic disks 7 through a magnetic head (not shown).

However, while the flange is at rest as shown in FIG. 10, circumferential projection 3d on the periphery of the bottom face of flange 3 and thrust support 4a on plate 4 are in intimate contact with each other. Therefore, immediately after start-up of rotating shaft 2, only a small amount of lubricant 5 exiting outside of the bearing can move into between grooves 3b and thrust support 4a. This phenomenon has caused the following problems: the rotating body including rotating shaft 2 does not float up in the predetermined position, the reliability of the bearing cannot be maintained, and a magnetic head (not shown) cannot correctly be positioned with respect to the magnetic disks to perform correct recording and reproduction of signals.

Similarly, when the motor is used in a vertically inverted position as shown in FIG. 11, circumferential projection 3c on the periphery of the top face of flange 3 and thrust support 1b on base 1 are in intimate contact with each other while the flange is at rest. Therefore, when rotating shaft 2 starts to rotate, lubricant 5 existing outside of the bearing cannot move into between grooves 3a and thrust support 1b easily. This phenomenon has also caused the following problems: the rotating body including rotating shaft 2 does not float up in the predetermined position, the reliability of the bearing cannot be maintained, and the magnetic head (not shown) cannot perform correct recording or reproducing to or from the magnetic disks 7.

The present invention addresses the problems of conventional spindle motor units discussed above. Therefore, it is an object of the present invention to provide a spindle motor unit having a hydrodynamic bearing that allows lubricant to easily move from the outside into the inside of the bearing at start-up of rotation to thereby ensure the reliability as a thrust bearing and correct recording and reproducing operations.

SUMMARY OF THE INVENTION

A spindle motor unit having a hydrodynamic bearing in accordance with a first exemplary embodiment of the present invention has an escape formed at a corner of the base facing to the periphery of the top face of the flange and a circumferential recess formed in the plate in a position facing to the periphery of the bottom face of the flange as shown in FIG. 2. At start-up of rotation, lubricant existing around the peripheries of the flange easily moves through the above escape in the base and the circumferential recess in the plate into the thrust bearing, thus floating up the rotating body in a predetermined position. Assuming the diameter of the escape in the thrust support on the base is $\phi d1$, the outermost diameter of the grooves on the top face of the flange is $\phi d2$, the outermost diameter of the grooves on the bottom face of the flange is $\phi d3$, the outer diameter of the flange is $\phi d4$, the outer diameter of the circumferential recess in the plate is $\phi d5$, the inner diameter of the circumferential recess is $\phi d6$, relations $\phi d1 < \phi d2$, $\phi d6 < \phi d3$, and $\phi d4 < \phi d5$ hold.

In a spindle motor unit having a hydrodynamic bearing in accordance with a second exemplary embodiment of the present invention, areas around the peripheries of the top and bottom faces of the flange are formed with depressions as shown in FIG. 6. Since these depressions are continuous with the grooves on the top and bottom faces of the flange, lubricant existing around the peripheries of the flange moves into the thrust bearing easily at start-up of rotation, thus floating up the rotating body in the predetermined position.

DETAILED DESCRIPTION OF THE INVENTION (Exemplary Embodiment 1)

Figure 1:
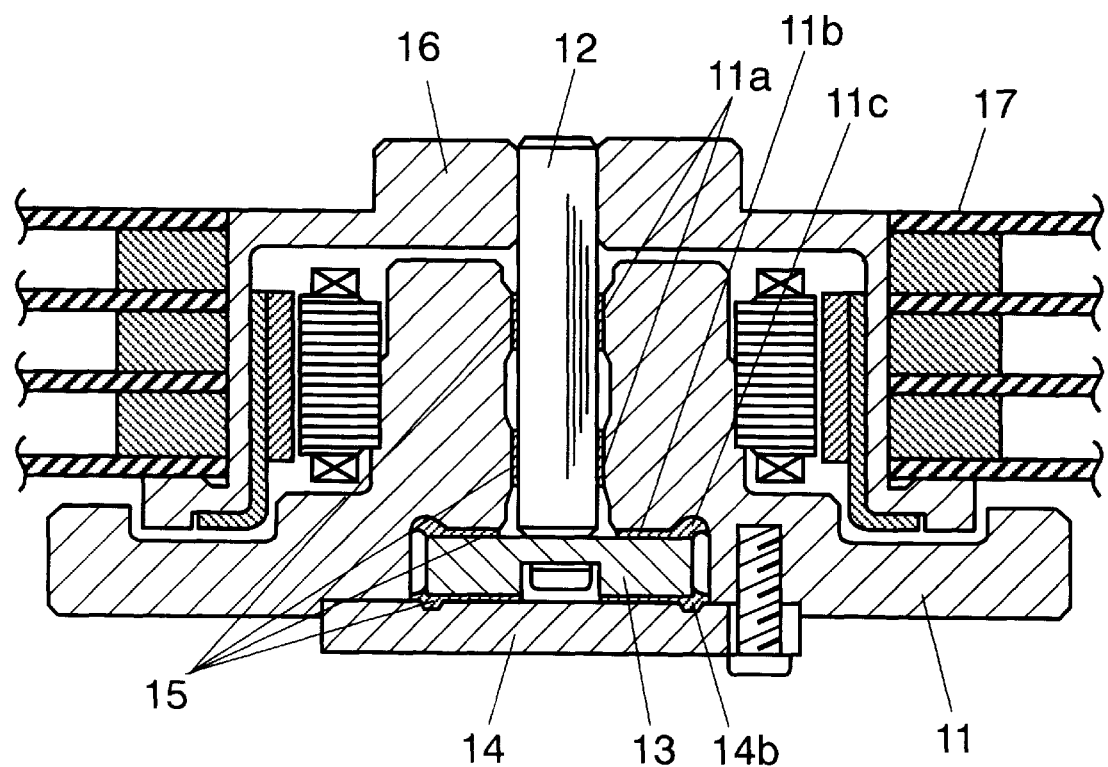
FIG. 1 is a cross sectional view of a spindle motor unit having a hydrodynamic bearing in accordance with a first exemplary embodiment of the present invention at rotation.
Figure 2:
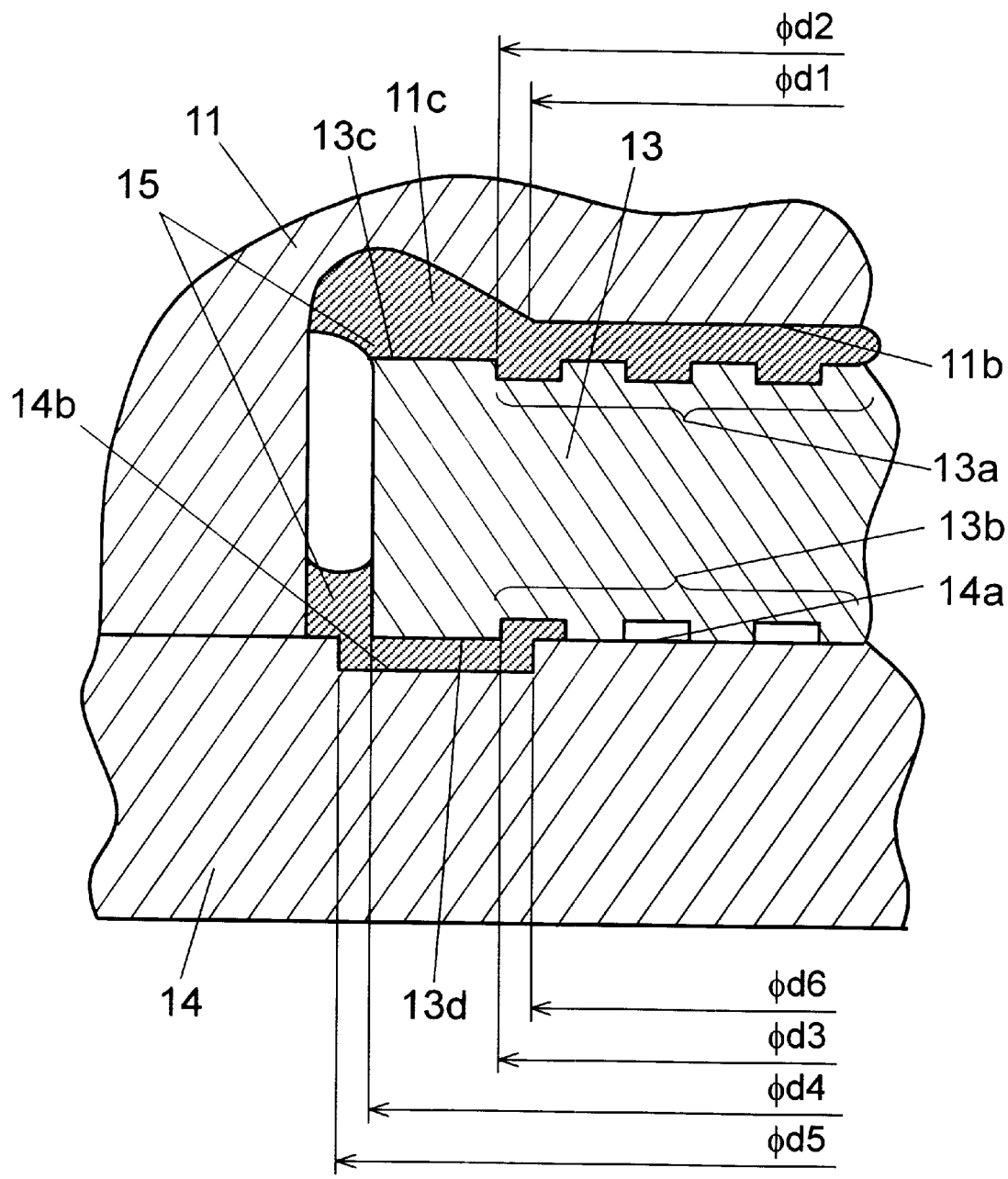
FIG. 2 is an enlarged partial view of FIG. 1 illustrating a thrust bearing of the spindle motor unit having the hydrodynamic bearing in accordance with the first exemplary embodiment of the present invention, at rest and placed in a normal position.
Figure 3:
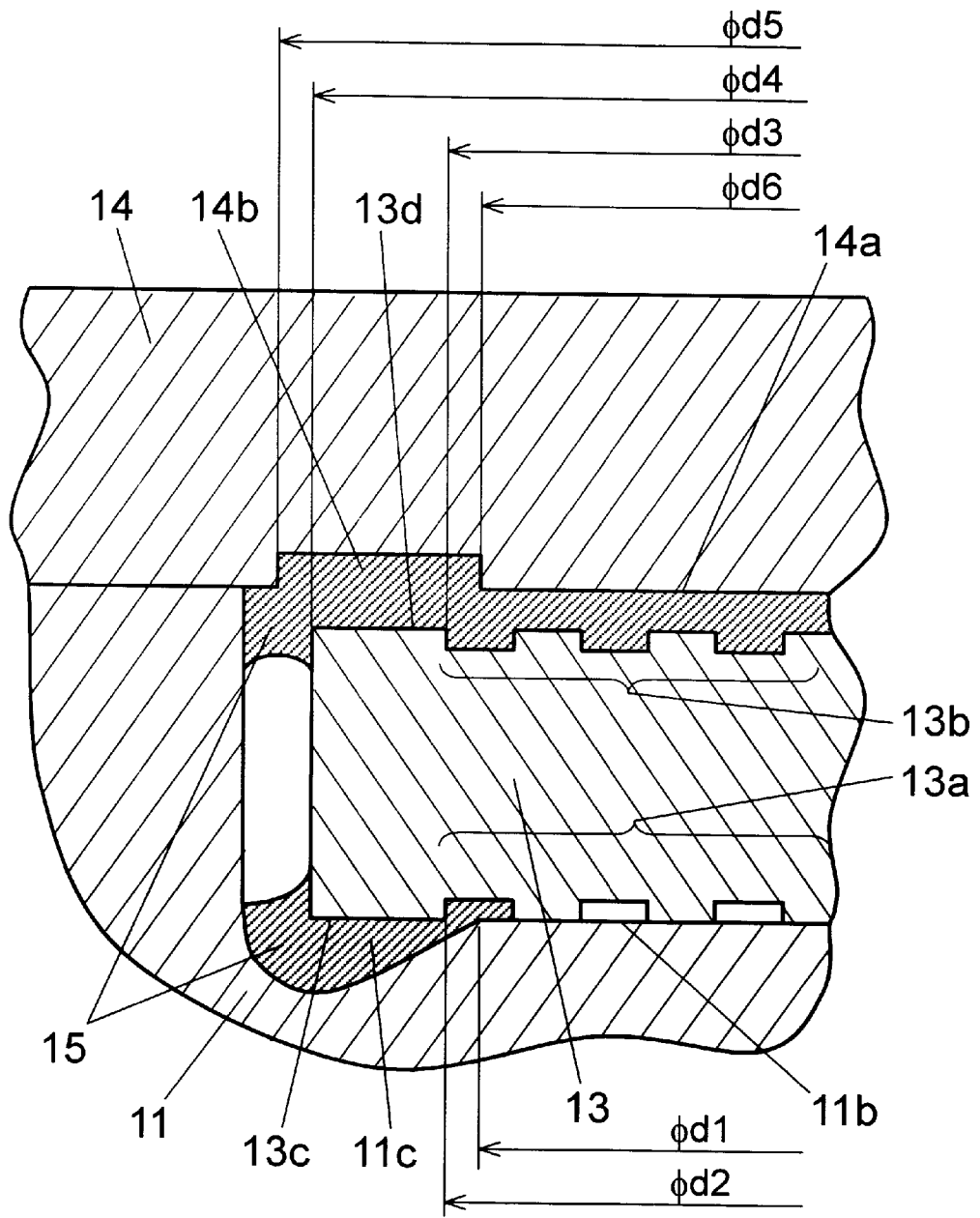
FIG. 3 illustrates the thrust bearing shown in FIG. 2 at rest and placed in a vertically inverted position on an enlarged scale.
Figure 4:
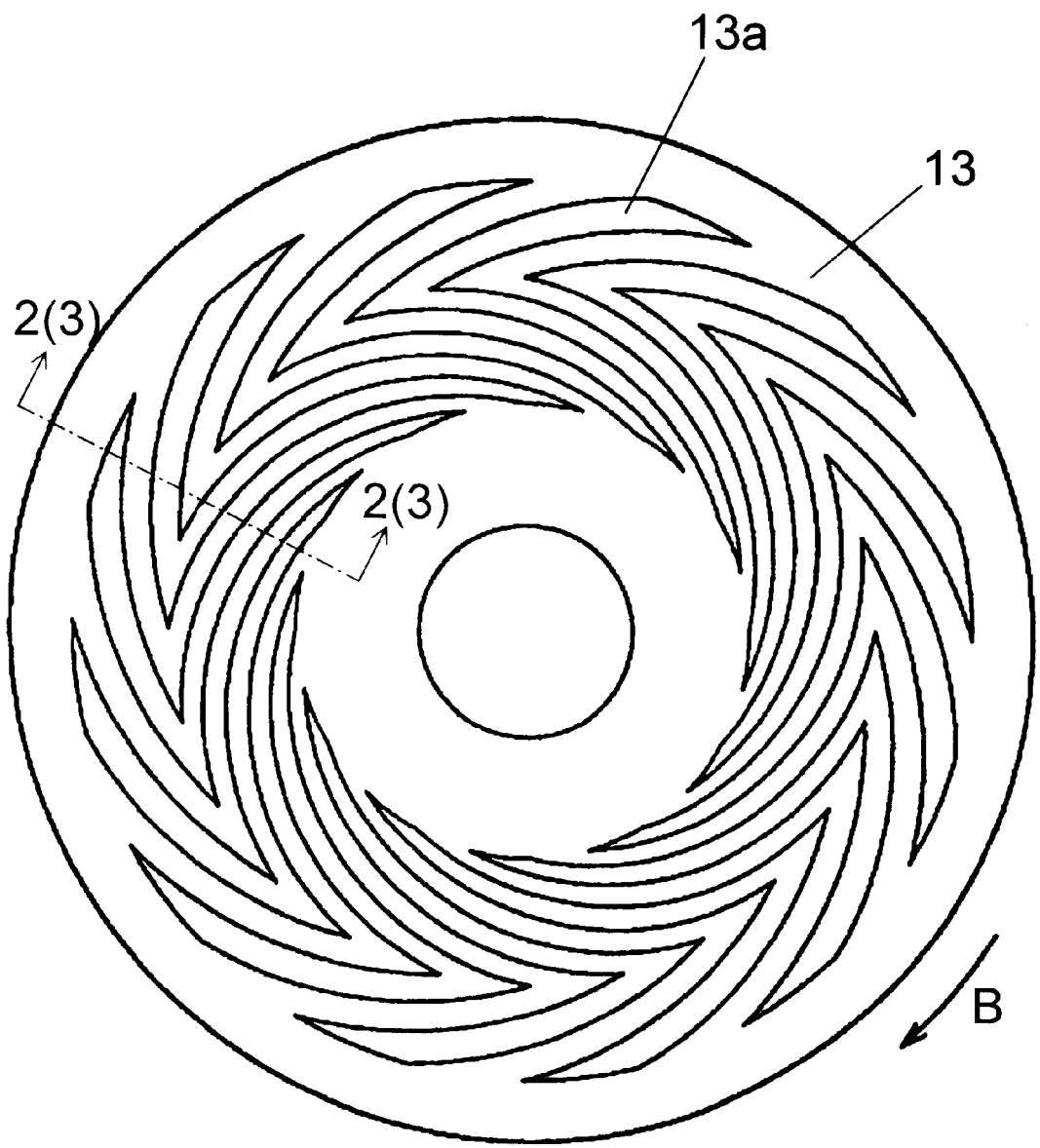
FIG. 4 is a top view of a flange used in the spindle motor unit having the hydrodynamic bearing in accordance with the first exemplary embodiment of the present invention.

With reference to FIGS. 1 through 4, a first exemplary embodiment of the present invention is described below. FIG. 1 is a cross sectional view of a spindle motor unit having a hydrodynamic bearing in accordance with the first exemplary embodiment of the present invention at rotation. FIG. 2 is an enlarged partial view of FIG. 1, illustrating a thrust bearing of the spindle motor unit at rest and placed in a normal position. FIG. 3 shows the thrust bearing of FIG. 2 at rest and placed in a vertically inverted position. FIG. 4 is a top view of flange 13 used in the spindle motor unit shown in FIG. 1, and cross sectional views of flange 13 shown in FIGS. 2 and 3 are parts of those taken on lines 2(3)—2(3) of FIG. 4.

Referring to FIGS. 1 through 4, base 11 has radial bearing 11a for supporting a shaft in a radial direction, thrust support 11b provided on a first bottom face of base 11 for supporting the flange in a thrust direction, escape 11c with $\phi d1$ in diameter provided at a corner of the base opposed to flange 13, and a second bottom face on which plate 14 is secured. Rotating shaft 12 that co-axially rotates with respect to base 11 is supported by radial bearing 11a. Flange 13 is secured to the lower end of rotating shaft 12 by a machine screw. Flange 13 has grooves 13a with $\phi d2$ in outermost diameter and grooves 13b with $\phi d3$ in outermost diameter on its top and bottom faces, respectively, and both grooves are formed of projections and depressions. The outer diameter of flange 13 is $\phi d4$. Grooves 13a and 13b are shaped like herringbone as shown in FIG. 4. Lubricant 15 has flowed into the grooves from the outermost portions of the grooves while the flange is at rest as shown FIGS. 2 and 3; thus, during its rotation, lubricant 15 moves toward substantially V-shaped bends in the herringbone shape. Plate 14 is secured to the second bottom face of base 11 by a machine screw. Plate 14 has thrust support 14a provided in a position opposed to grooves 13b on flange 13, and has circumferential recess 14b with $\phi d5$ in outer diameter and $\phi d6$ in inner diameter. Lubricant 15 exists between radial bearing 11a and rotating shaft 12, between thrust support 11b on base 11 and grooves 13a on flange 13, and between grooves 13b on flange 13 and thrust support 14a on plate 14. Hub 16 co-axially fixed to rotating shaft 12 has magnetic disks 17 mounted thereon. Magnetic disks 17 are a recording medium capable of recording and reproducing picture and sound signals and such information signals as text data. In this embodiment, the magnetic disks 17 are hard disks generally used for personal computers, and the like; however, it is not limited to them. Now, assuming the innermost diameter of the escape 11c is $\phi d1$, the outermost diameters of grooves 13a and 13b on flange 13 are $\phi d2$ and $\phi d3$, respectively, the outer diameter of flange 13 is $\phi d4$, the outer diameter of circumferential recess 14b is $\phi d5$, the inner diameter of circumferential recess 14b is $\phi d6$, relations $\phi d1 < \phi d2$, $\phi d6 < \phi d3$, and $\phi d4 < \phi d5$ hold.

In a spindle motor unit having a hydrodynamic bearing structured as above, a rotating body including magnetic disks 17 and rotating shaft 12 floats up in a predetermined position during its rotation; thereby information, including picture and audio signals and text data, is recorded into magnetic disks 17 or recorded information is reproduced from magnetic disks 17 through a magnetic head (not shown). Since circumferential recess 14b is provided so that relations $\phi d6 < \phi d3$ and $\phi d4 < \phi d5$ hold, circumferential projection 13d on the periphery of the bottom face of flange 13 and the bottom of circumferential recess 14b in plate 14 are not in contact with each other while the flange is at rest as shown in FIG. 2. The grooves 13b are shaped like herringbone as shown in FIG. 4, and moreover, circumferential recess 14b is partially faced to the outermost portions of grooves 13b; thus, lubricant 15 exists in the outermost portions of grooves 13b while flange 13 is at rest. When flange 13 starts rotation in the direction of arrow B shown in FIG. 4 in this state, lubricant 15 in the outermost portions of grooves 13b and circumferential recess 14b moves toward the centers of the grooves (substantially V-shaped bends in the grooves) along the herringbone shape. As lubricant 15 moves into the centers of the grooves, it enters between flange 13 and thrust support 14a, thereby, allowing flange 13 to rotate and float upward without fail as it rotates at high speeds.

The case where the spindle motor unit having the hydrodynamic bearing of this embodiment is used in a vertically inverted position as shown in FIG. 3 is described. Similarly, since escape 11c is provided in base 11 so that the relation $\phi d1 < \phi d2$ holds, circumferential projection 13c on the periphery of the top face of flange 13 and escape 11c in base 11 are not in intimate contact with each other while the flange is at rest. Moreover, since the escape is partially faced to a part of grooves 13a, lubricant 15 exists in the outermost portions of grooves 13a. When flange 13 starts rotation in this state, lubricant 15 in the outermost portions of grooves 13a and escape 11c moves toward the centers of the grooves (substantially V-shaped bends in the grooves) along the herringbone shape. As lubricant 15 moves toward the centers of the grooves, it enters between flange 13 and thrust support 11b, thereby allowing flange 13 to rotate and float upward without fail as it rotates at high speeds.

As herein above described, with the spindle motor unit having the hydrodynamic bearing of this embodiment, lubricant 15 can move from the outside into the inside of the thrust bearing easily, even when the motor unit is placed in any position. Thereby, a rotating body including rotating shaft 12 floats up in a predetermined position at rotation, reliability of the bearing is maintained, and correct recording and reproduction can be performed to and from magnetic disks 17 through a magnetic head.

(Exemplary Embodiment 2)

Figure 5:
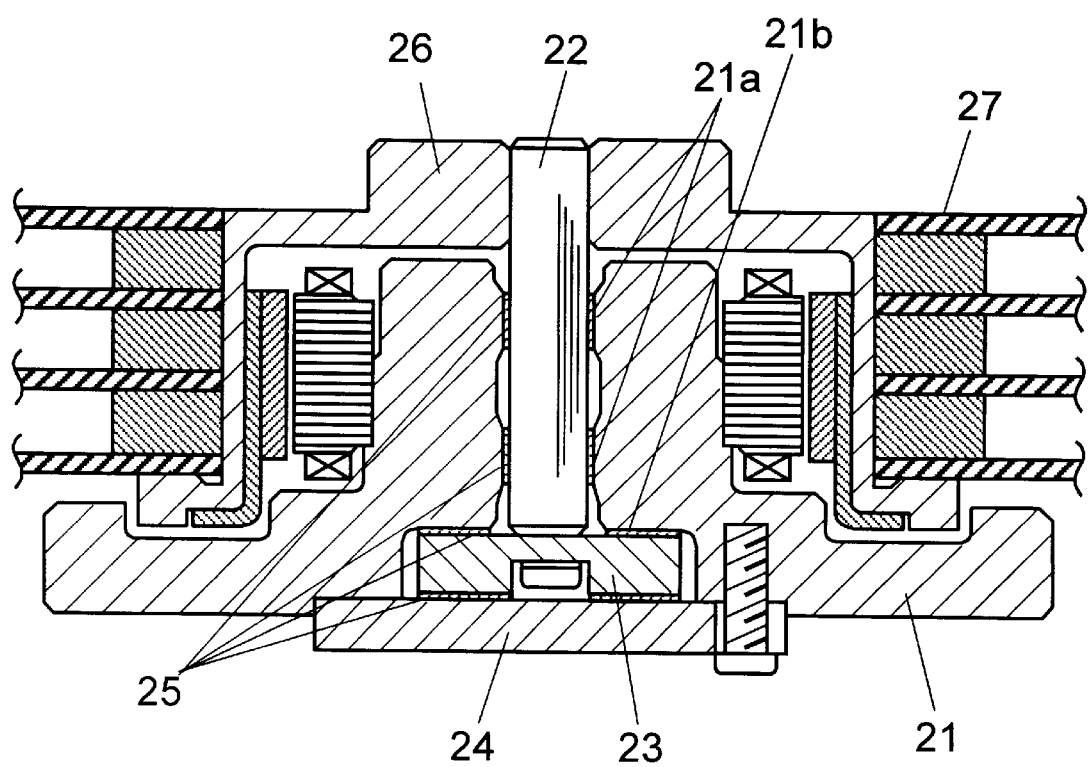
FIG. 5 is a cross sectional view of a spindle motor unit having a hydrodynamic bearing in accordance with a second exemplary embodiment of the present invention at rotation.
Figure 6:
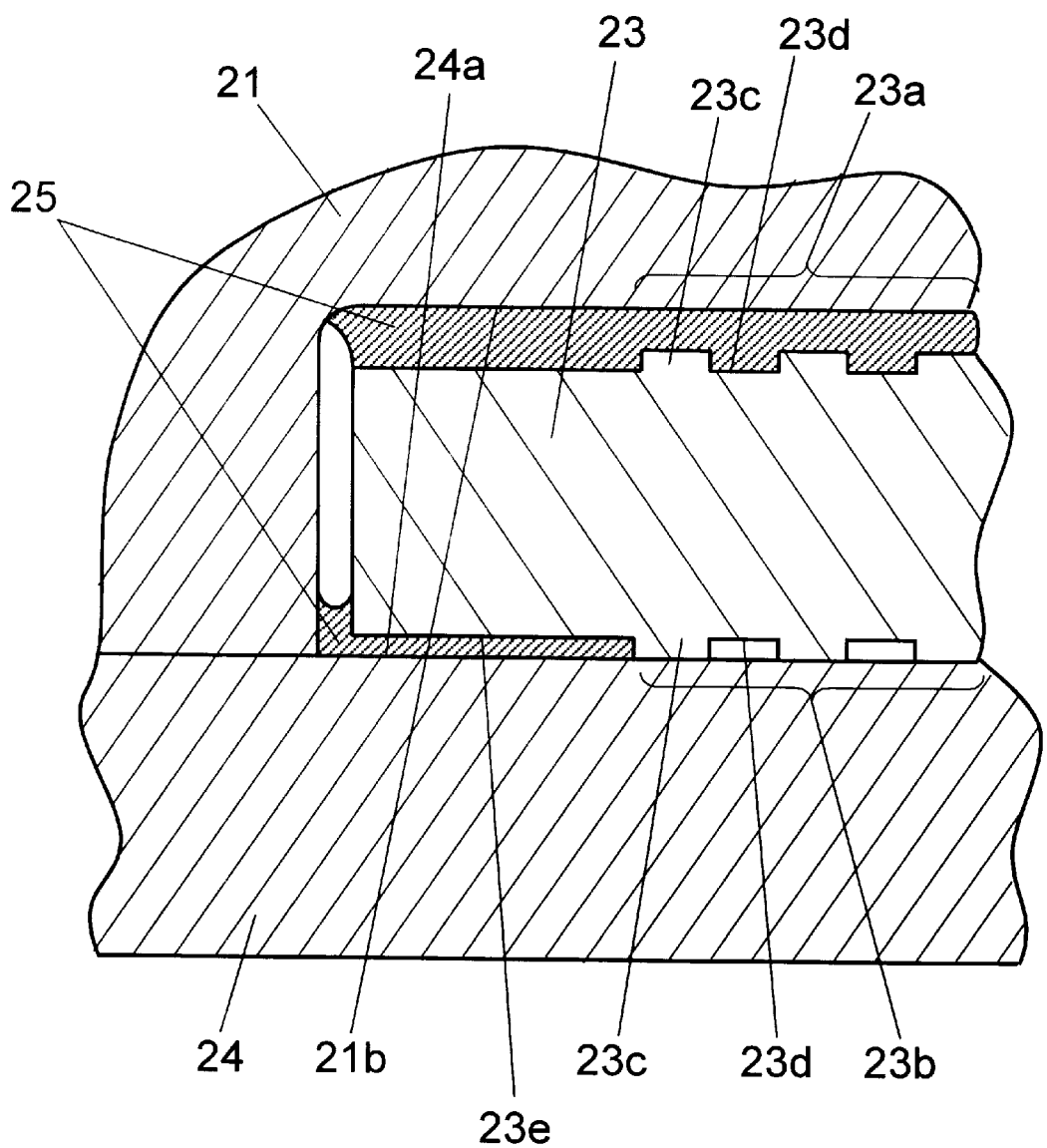
FIG. 6 is an enlarged partial view of FIG. 5 illustrating a thrust bearing of the spindle motor unit having the hydrodynamic bearing in accordance with the second exemplary embodiment of the present invention at rest and placed in a normal position.
Figure 7:
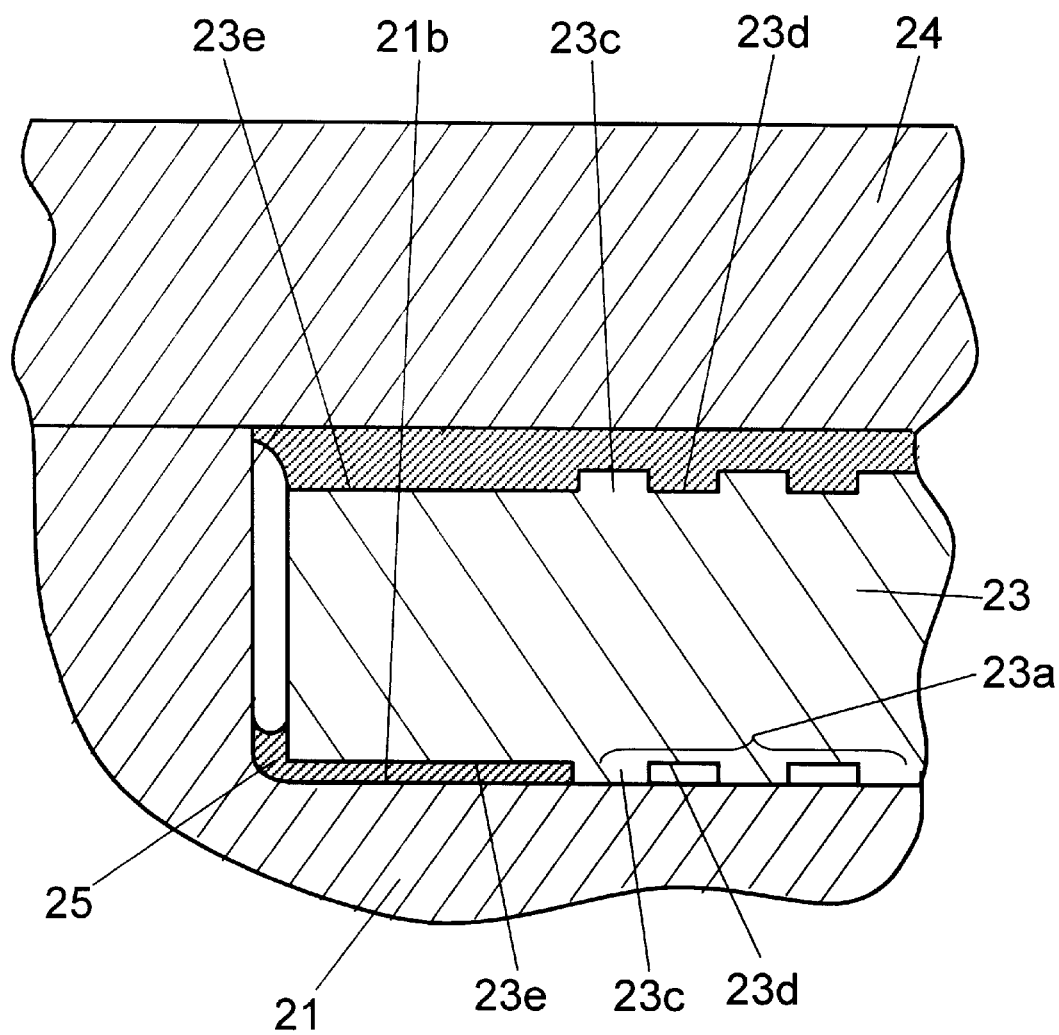
FIG. 7 illustrates the thrust bearing shown in FIG. 6 at rest and placed in a vertically inverted position.
Figure 8:
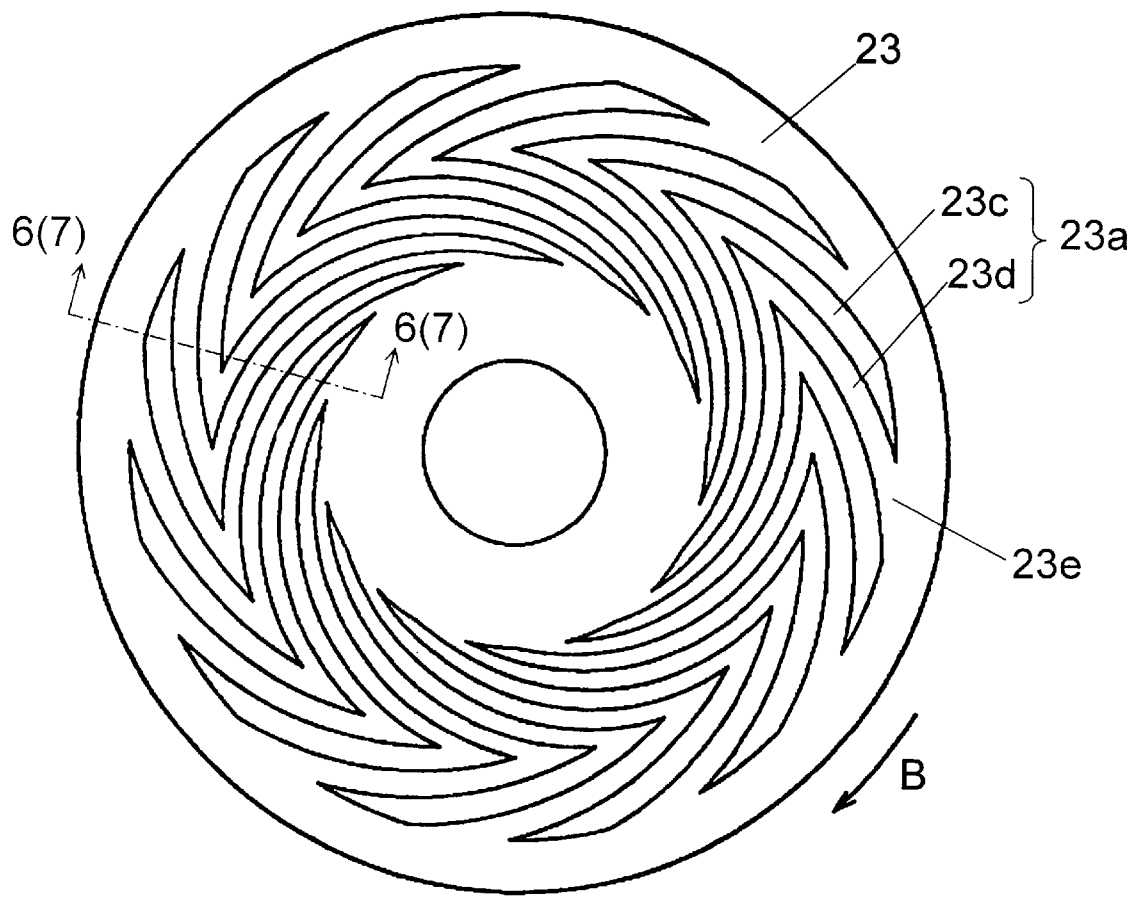
FIG. 8 is a top view of a flange used in the spindle motor unit having the hydrodynamic bearing in accordance with the second exemplary embodiment of the present invention.
Figure 9:
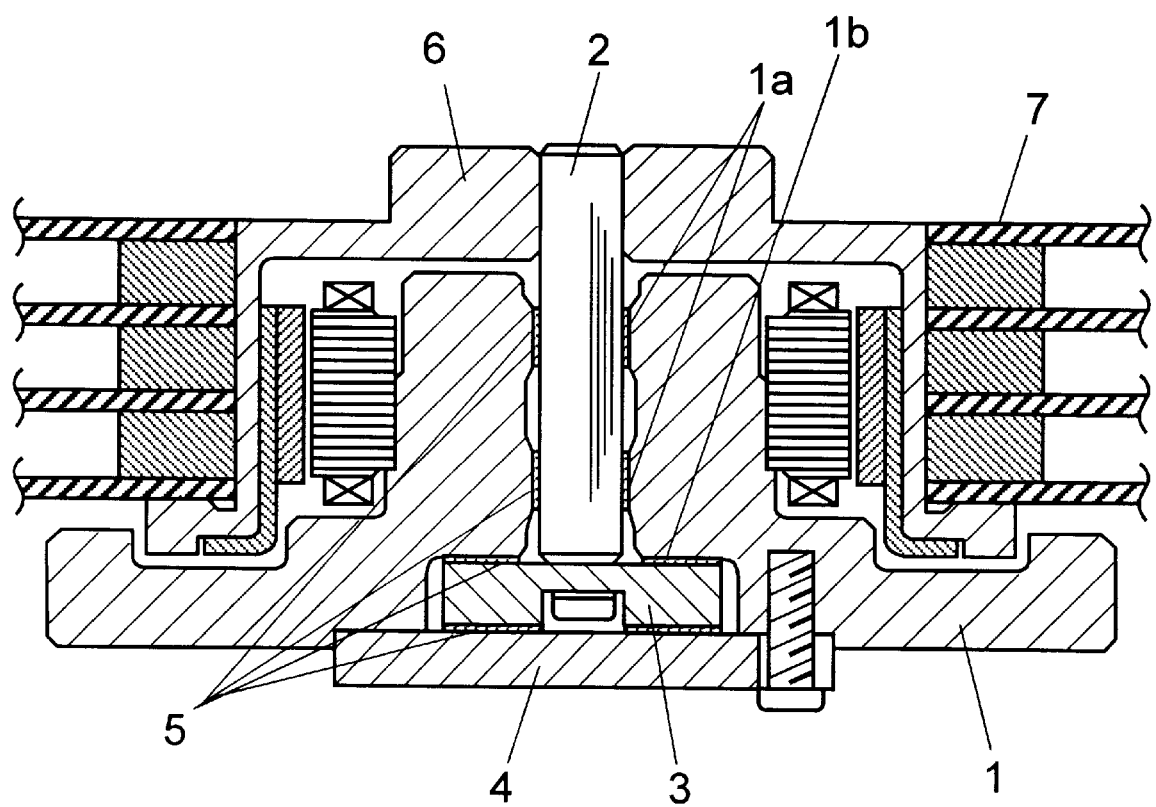
FIG. 9 is a cross sectional view of a conventional spindle motor unit having a hydrodynamic bearing at rotation.
Figure 10:
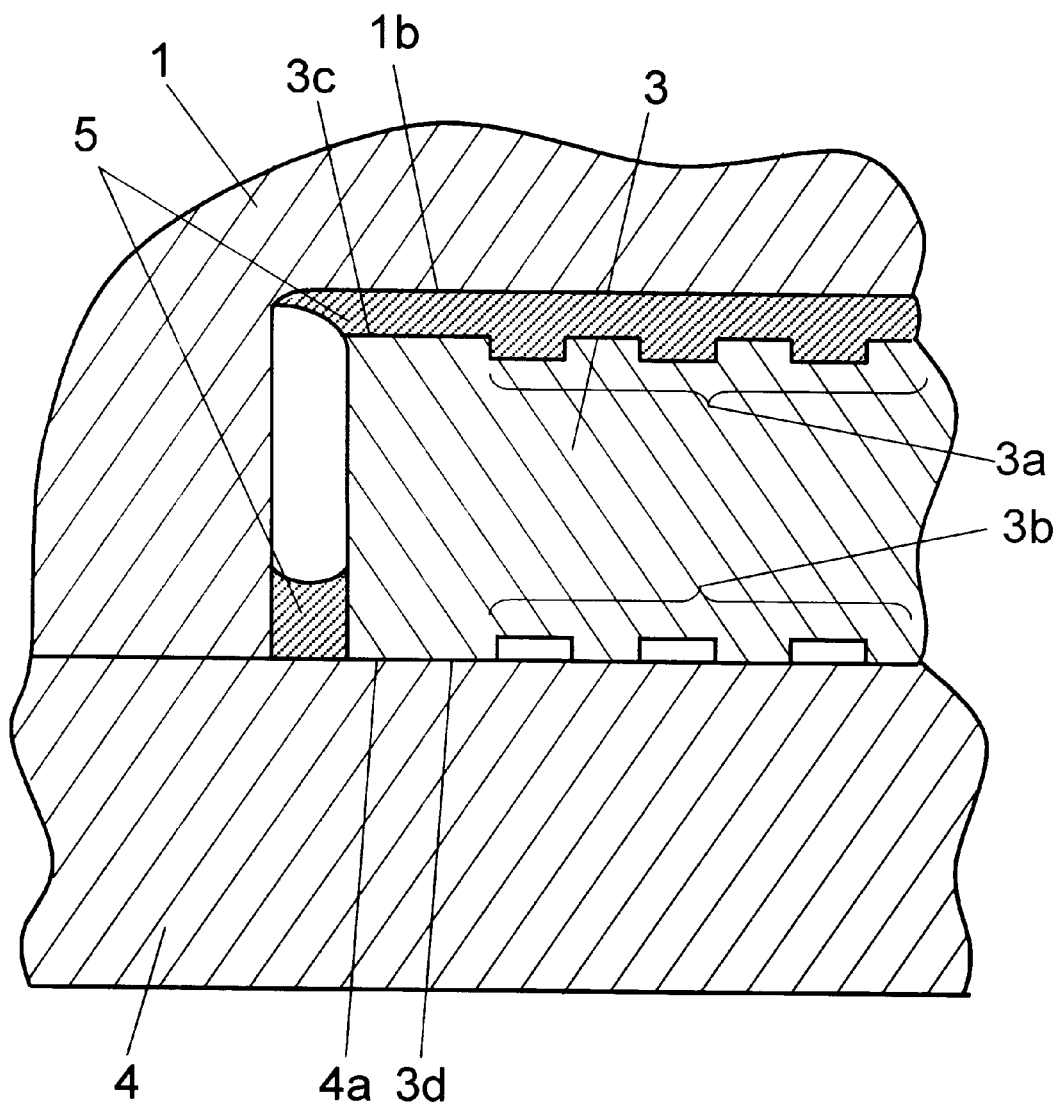
FIG. 10 is an enlarged partial view of FIG. 9 illustrating a thrust bearing of the conventional spindle motor unit having the hydrodynamic bearing at rest and placed in a normal position.
Figure 11:
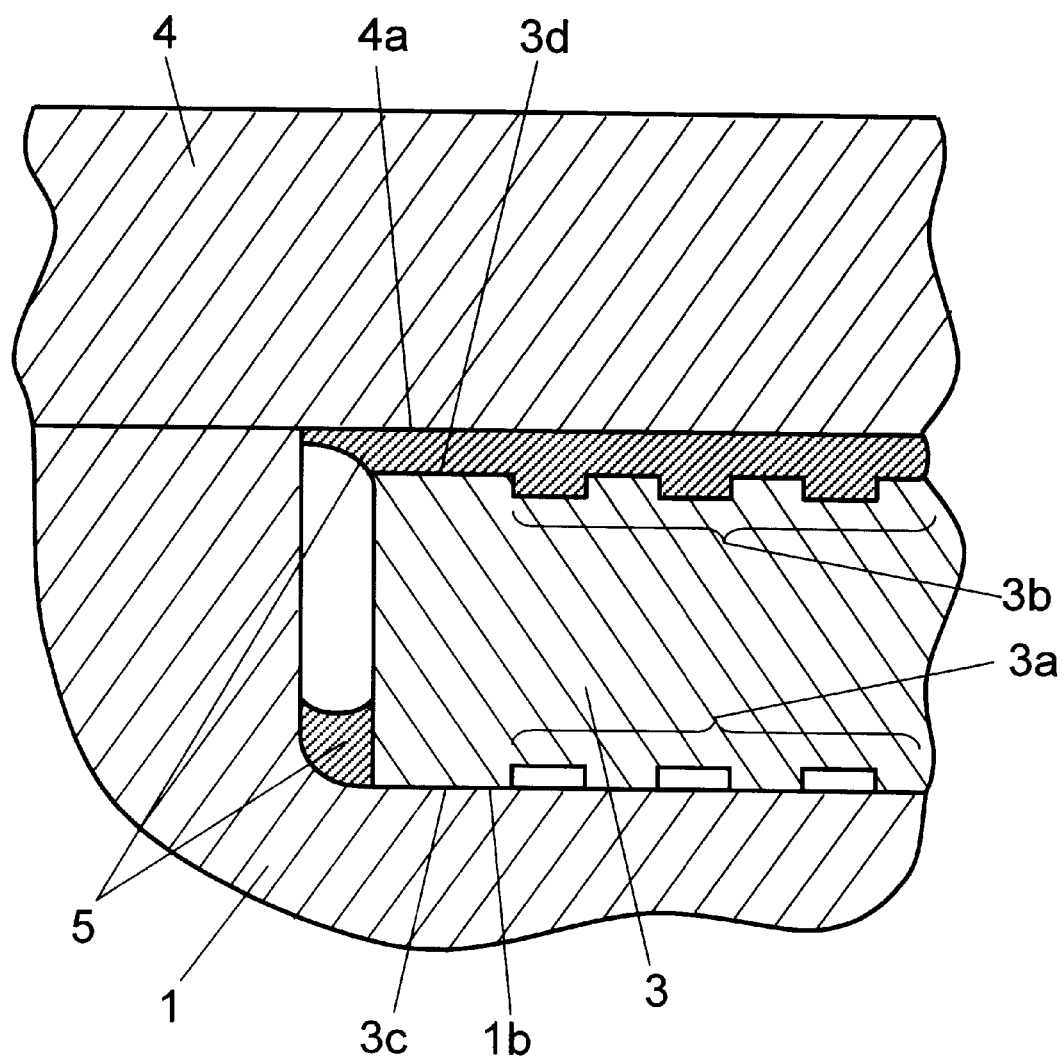
FIG. 11 illustrates the thrust bearing shown in FIG. 10 at rest and placed in a vertically inverted position.
Figure 12:
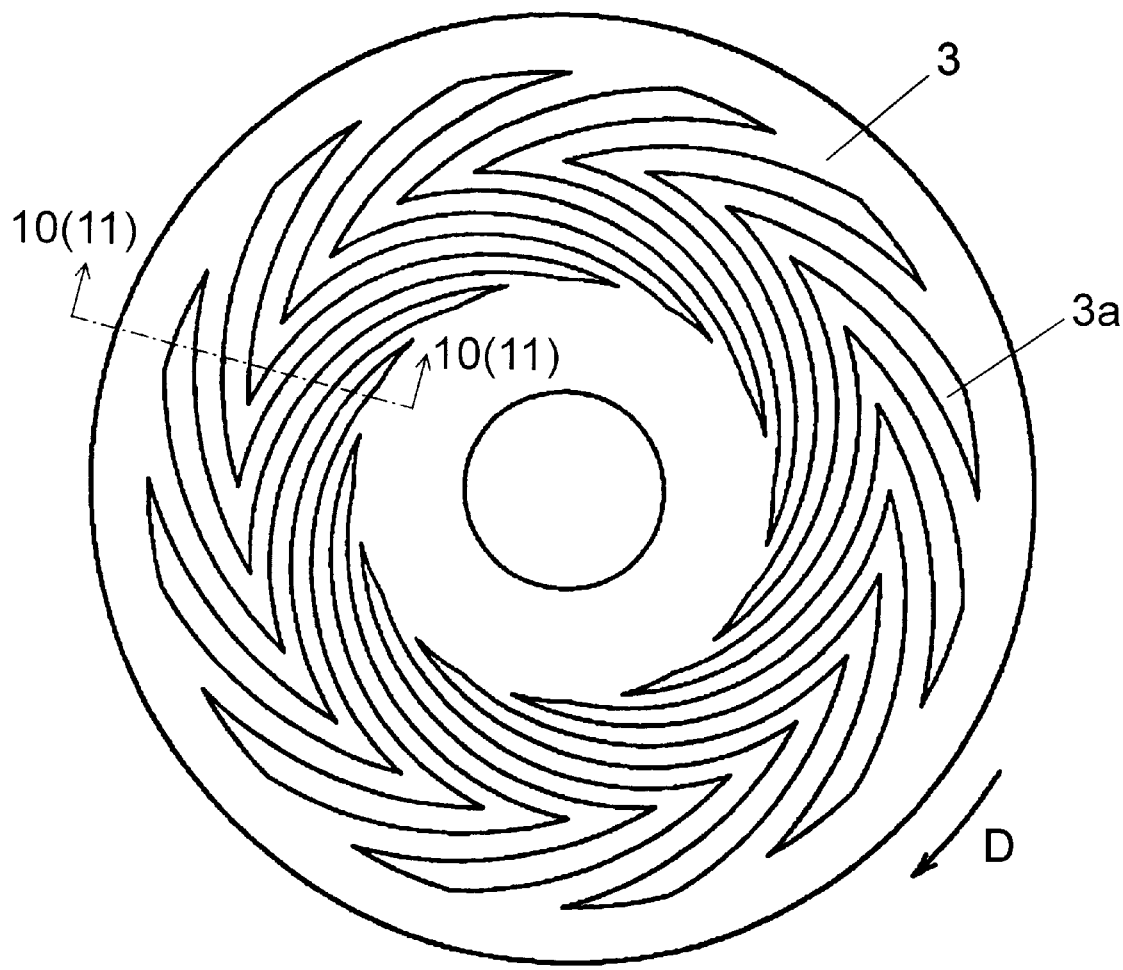
FIG. 12 is a top view of a flange used in the conventional spindle motor unit having the hydrodynamic bearing.

With reference to FIGS. 5 through 8, a second exemplary embodiment of the present invention is described below. FIG. 5 is a cross sectional view of a spindle motor unit having a hydrodynamic bearing in accordance with the second exemplary embodiment of the present invention at rotation. FIG. 6 is an enlarged partial view of FIG. 5 illustrating a thrust bearing of the spindle motor unit at rest and placed in a normal position. FIG. 7 shows the thrust bearing of FIG. 6 at rest and placed in a vertically inverted position. FIG. 8 is a top view of flange 23 used in the spindle motor unit shown in FIG. 5, and cross sectional views of flange 23 shown in FIGS. 6 and 7 are parts of those taken on lines 6(7)—6(7) of FIG. 8.

Referring to FIGS. 5 through 8, base 21 has radial bearing 21a and thrust support 21b. Rotating shaft 22 that co-axially rotates with respect to base 21 is supported by radial bearing 21a. Flange 23 is secured to the lower end of rotating shaft 22 by a machine screw. Flange 23 has grooves 23a and 23b formed of projections and depressions on its top and bottom faces, respectively. Grooves 23a and 23b are shaped like herringbone as shown in FIG. 8 and formed of projections 23c and depressions 23d. Depressions 23d are continuous with peripheral flat portions 23e on flange 23 and formed between the projections. Projections 23c are co-axially provided on flange 23 as a plurality of substantially V-shaped projections as shown in FIG. 8, and in contact with thrust support 24a as shown in FIG. 6 while flange 23 is at rest. While the flange is at rest as shown in FIGS. 6 and 7, lubricant 25 exiting between peripheral flat portion 23e located outer than grooves 23a and 23b and thrust support 24a has already flowed into a part of depressions 23d, because peripheral flat portion 23e is in fluid communication with depressions 23d. Lubricant 25 moves toward the substantially V-shaped bends in the herringbone shape during rotation of flange 23. Plate 24 is secured to the bottom face of base 21 by a machine screw. Plate 24 has thrust support 24a in a position opposed to grooves 23b and peripheral flat portion 23e on flange 23. Lubricant 25 exists between radial bearing 21a and rotating shaft 22, between thrust support 21b on base 21 and grooves 23a on flange 23, and between grooves 23b on flange 23 and thrust support 24a on plate 24. Hub 26 co-axially fixed to rotating shaft 22 has magnetic disks 27 mounted thereon. Magnetic disks 27 are a recording medium capable of recording and reproducing picture signals and various information signals, such as text data. In this embodiment, magnetic disks 27 are hard disks generally used for personal computers and the like; however, it is not limited to them.

In a spindle motor unit having a hydrodynamic bearing structured as above, a rotating body including magnetic disks 27 and rotating shaft 22 floats up in a predetermined position during its rotation; thereby such information as picture, audio, and text, can be recorded into magnetic disks 27 or recorded information is; reproduced from magnetic disks 27 through a magnetic head (not shown). While the flange is at rest as shown in FIG. 6, the area around peripheral flat portion 23e on flange 23 and trust support 24a on plate 24 are not in intimate contact with each other because grooves 23a and 23b have projections 23c. Lubricant 25 exists between the area and thrust support 24a, and has already flowed into a part of depressions 23d. When flange 23 starts rotation in the direction of arrow B shown in FIG. 8 in this state, lubricant 25 existing between the area around the peripheral flat portion of flange 23 (area located outer than the grooves) and thrust support 24a, in a part of depressions 23d, and outside of the flange moves through depressions 23d toward the centers of grooves 3a (substantially V-shaped bends in the grooves) along the herringbone shape. As lubricant 25 moves toward the centers of grooves 23a, lubricant 25 outside of the flange sequentially enters depressions 23d. When a certain amount of lubricant 25 has entered the centers of the grooves, it allows flange 23 to rotate and float upward as it rotates at high speeds.

The case where the spindle motor unit having the hydrodynamic bearing of this embodiment is used in a vertically inverted position as shown in FIG. 7 is described. Similarly, the area around periphery flat portion 23e (area outer than grooves 23a) and thrust support 21b on base 21 are not in intimate contact with each other while the flange is at rest because projections 23c are formed, and lubricant 25 has already flowed into a part of depressions 23d. When rotating shaft 22 and flange 23 start rotation, lubricant 25 existing outside of the flange can move into depressions 23d easily. When rotating shaft 22 and flange 23 start rotation in the direction of arrow B shown in FIG. 8 in this state, lubricant 25 existing between the area around peripheral flat portion 23e on flange 23 (area located outer than the grooves) and thrust support 21b, in a outer part of depressions 23d, and outside of the flange moves through depressions 23d toward the centers of grooves 23a (substantially V-shaped bends in the grooves) along the herringbone shape. As lubricant 25 moves toward the centers of grooves 23a, lubricant 25 located outside of the flange sequentially enters depressions 23d. When a certain amount of lubricant 25 has entered the centers of the grooves, it allows flange 23 to rotate and float upward without fail as it rotates at high speeds.

As hereinabove described, with the spindle motor unit having the hydrodynamic bearing of this embodiment, lubricant 25 can easily move rom the outside into the inside of the thrust bearing, even when the motor unit is placed in any position. Thereby, a rotating body including rotating shaft 22 floats up in a predetermined position at rotation, the reliability of the bearing is maintained, and correct recording and reproduction can be performed to and from magnetic disks 27 through a magnetic head.

What is claimed is:

1. A spindle motor unit having a hydrodynamic bearing having:

a base having a radial bearing on an inner diameter surface thereof, a thrust support on a first bottom face thereof, and a second bottom face, the thrust support having an escape at a corner thereof;

a rotating shaft supported by the radial bearing and co-axially rotating with respect to said base;

a flange fixed to a lower end of said rotating shaft, said flange having grooves formed of projections and depressions on top and bottom faces thereof, respectively;

a plate held on the second bottom face of said base, said plate having a thrust support and a circumferential recess in a position opposed to the bottom face of said flange; and lubricant existing between the radial bearing on said base and said rotating shaft, between the thrust support on the first bottom face of said base and the grooves on the top face of said flange, and between the grooves on the bottom face of said flange and the thrust support on said plate;

wherein assuming a diameter of the escape in the thrust support on said base is $\phi d1$, an outermost diameter of the grooves on the top face of said flange is $\phi d2$, an outermost diameter of the grooves on the bottom face is $\phi d3$, an outer diameter of said flange is $\phi d4$, an outer diameter of the circumferential recess in said plate is $\phi d5$, and an inner diameter of the circumferential recess in said plate is $\phi d6$, relations $\phi d1 < \phi d2$, $d6 < \phi d3$, and $\phi d4 < \phi d5$ hold.

* * * * *